(12) United States Patent
Gutierrez et al.

(10) Patent No.: US 9,169,073 B2
(45) Date of Patent: Oct. 27, 2015

(54) CONVEYOR (71) Applicant: Mikron SA, Boudry (CH)

(72) Inventors: Jose-Andres Gutierrez, Neuchâtel (CH); Serge Thiebaud, Colombier (CH); Olivier Neumann, Neuchâtel (CH); Jean-Charles Authier, Neuchâtel (CH)

(73) Assignee: Mikron SA (CH)

( * ) Notice: Subject to any disclaimer, the term of this patent is extended or adjusted under 35 U.S.C. 154(b) by 0 days.

(21) Appl. No.: 14/372,166

(22) PCT Filed: Jan. 18, 2013

(86) PCT No.: PCT/EP2013/050989
§ 371 (c)(1),
(2) Date: Jul. 14, 2014

(87) PCT Pub. No.: WO2013/110559
PCT Pub. Date: Aug. 1, 2013

(65) Prior Publication Data
US 2014/0346012 A1    Nov. 27, 2014

(30) Foreign Application Priority Data

Jan. 23, 2012    (CH) .......................................... 94/12

(51) Int. Cl.
*B65G 47/00* (2006.01)
*B65G 17/12* (2006.01)
(Continued)

(52) U.S. Cl.
CPC ................ *B65G 17/12* (2013.01); *B65G 15/60* (2013.01); *B65G 21/02* (2013.01); *B65G 2812/02217* (2013.01)

(58) Field of Classification Search
CPC ........ B65G 17/12; B65G 15/60; B65G 15/50; B65G 15/12; B65G 21/20; B65G 2812/022173

USPC ............... 198/816, 817, 837, 840, 841, 469.1
See application file for complete search history.

(56) References Cited

U.S. PATENT DOCUMENTS 2,728,445 A * 12/1955 Erickson ........................ 198/835
3,508,642 A    4/1970 Standley et al.
(Continued)

FOREIGN PATENT DOCUMENTS

DE    3141510 A1    5/1983
EP    1472161 A1    11/2004
(Continued)

*Primary Examiner* — William R Harp
(74) *Attorney, Agent, or Firm* — Blank Rome LLP (57) ABSTRACT

A conveyor (3) having a first belt (7a) which is configured to move in a closed loop (19); a support element (15) which includes first surface (16a) which is configured to cooperate with a first surface (17a) of the first belt (7a) to support the first belt (7a) during an outgoing part of the closed loop (19) and a second surface (16b) and is configured to cooperate with a second surface (17b) of the first belt (7a) to support the first belt (7a) during a return part of the closed loop (19), so that the first belt (7a) is prevented from hanging. A second belt (7b) is configured to move in a closed loop (19), and the support element (15) has a third surface (16c) which is configured to cooperate with a first surface (18a) of the second belt (7b) to support the second belt (7b) during an outgoing part of the closed loop (19) and a fourth surface (16d) which cooperates with a second surface (18b) of the second belt (7b) to support the second belt (7b) during a return part of the closed loop (19), so that the second belt (7b) is prevented from hanging. The support element (15) includes a member which has an inverted T-shaped cross-section, which defines the second and fourth surfaces (18b,16d). There is further provided a puck (5a-c) which can cooperate with the conveyor (3), and a conveyor assembly which comprises the conveyor (3) and one or more pucks (5a-c).

10 Claims, 8 Drawing Sheets (51) Int. Cl.
 *B65G 15/60* (2006.01)
 *B65G 21/02* (2006.01)

(56) References Cited

U.S. PATENT DOCUMENTS 3,779,368 A * 12/1973 Smith ........................ 198/841
3,825,108 A * 7/1974 Stone ........................ 198/861.1
4,390,091 A 6/1983 Gonzalez
4,442,935 A 4/1984 Gregg
5,009,168 A * 4/1991 Kuchta ........................ 104/172.1
5,067,608 A * 11/1991 McLellan ........................ 198/817
6,247,581 B1 * 6/2001 Oswald et al. ........................ 198/812
2003/0141166 A1 7/2003 Hoveling

FOREIGN PATENT DOCUMENTS

FR 2650995 A1 2/1991
WO WO-03064295 A1 8/2003

* cited by examiner

CONVEYOR

FIELD OF THE INVENTION

This application is a National Stage of International Application No. PCT/EP2013/050989, filed Jan. 18, 2013, which claims priority to Application No. CH 0094/12, filed Jan. 23, 2012, the entire contents of which are incorporated herein by reference.

The present invention concerns a conveyor, and in particular, concerns a conveyor which comprises at least one belt which moves in a closed loop to convey components, and wherein the conveyor comprises a means to prevent the belt from hanging.

DESCRIPTION OF RELATED ART

Conveyor belts are commonly used in assemblies to move components between processing stations, or to deliver components from a loading station to an assembling station. These conveyors are typically defined by a belt which moves along a closed loop and which comprises pucks (or pallets) which hold a component as it is transported. A puck loaded with a component is moved by the belt along an outgoing part of the closed loop, the components are unloaded from the puck at some point along the outgoing part of the closed loop and the puck is then moved along a return part of the closed loop to be reloaded. The gravitational forces acting on the pucks will cause the pucks to frictionally engage the belt; thus ensuring that the pucks move with the belt along the closed loop.

In the return portion of the closed loop, the belt will hang under its own weight. The pucks will further pull on the belt increasing the amount the belt will hang.

As the belt hangs, this causes the gravitational forces acting on the pucks to increase so that they are greater than the frictional forces which exist between the pucks and the belt; this will cause the belt to slip, so that the puck are no longer moved by the belt. The pucks will thus collect on the portion belt which hangs and will not return with the belt for reloading. Consequently, no further components can be conveyed without an intervention to manually return the collected pucks to the beginning of the closed loop for reloading. Furthermore, the weight of the collection of pucks may apply a force to the belt of the conveyor which damages the conveyor and/or belt.

U.S. Pat. No. 4,442,935 discloses a conveyor which comprises chains which are rotated in a closed loop. Pallets, which hold components to be conveyed, are provided; the pallets cooperate with the chains so that they are moved with the chains. In the closed loop, as the chains returns, the underside of the pallets rest on support clips which are provided on the chain so that the pallets are moved with the chain. However, no means is provided to prevent the chains from hanging.

EP1472161 discloses a toothed belt which can move in one direction to transport components and which locks if moved in the opposite direction. Again the toothed belt follows a closed loop and does not comprise a means to prevent the toothed belt from hanging.

It is known to support conveyor belts during both their outgoing and incoming journeys. For example U.S. Pat. No. 4,390,091, FR2650995, DE3141510 all disclose conveyor belts which are mechanically supported on their outgoing and incoming journeys. However, in each case complex structures are required to support the belts. For example in U.S. Pat. No. 4,390,091 the support which supports the belt on its return journey is a series of support rollers; a plurality of support rollers must be provided along the length of the belt, thus increasing the number of components in the conveyor and increasing the complexity of the conveyor.

It is an aim of the present invention to obviate, or mitigate, at least some of the above-mentioned disadvantages.

BRIEF SUMMARY OF THE INVENTION

According to the invention, these aims are achieved by means of a conveyor comprising, a first belt which is configured to move in a closed loop; a support element which comprises first surface which is configured to cooperate with a first surface of the first belt to support the first belt during an outgoing part of the closed loop and a second surface which is configured to cooperate with a second surface of the first belt to support the first belt during a return part of the closed loop, so that the first belt is prevented from hanging.

The support element may comprise a first member which comprises a C-shaped cross section, which defines the first surface and a second member which comprises a C-shaped cross section, which defines the second surface.

The conveyor may comprise a second belt which is configured to move in a closed loop, and the support element comprises a third surface which is configured to cooperate with a first surface of the second belt to support the second belt during an outgoing part of the closed loop and a fourth surface which cooperates with a second surface of the second belt to support the second belt during a return part of the closed loop, so that the second belt is prevented from hanging.

The first and second belts may be arranged such that they are laterally spaced apart, adjacent to one another and on the same plane. The first and second belts may be of equal length. The first and second belts may be of equal width.

The first belt may comprise a smooth surface. Each of the first and second belts maybe belts which comprise a smooth surface.

The support element may comprise a member which has an inverted T-shaped cross-section, which defines the second and fourth surfaces.

The support element may comprise a member which has a T-shaped cross-section, which defines the first and third surfaces.

The member which has an inverted T-shaped cross-section and the member which has a T-shaped cross-section, may each comprise flanges which are configured to restrict lateral movement of the first and second belts.

The support element may comprise a first part and second part, wherein a gap is interposed between the first part and second part. The belts may be easily squeezed together at the gap facilitating the application of additional pucks to the belts.

The support element may further comprise a means for selectively adjusting and fixing the distance between the first part and second part so that the length of the support element can be adjusted to fit belts of various sizes. This will enable the length of the support element to be easily adjusted to fit belts of different lengths. For example, the support element can be adjusted to fit longer belts by increasing the distance between the first part and second part; the effective length of the support element may be increased allowing the support element to fit longer belts. Likewise, the distance between the first and second part may be shortened to allow the support element to fit a shorter belt.

The means for selectively adjusting and fixing the distance between the first part and second part, may take any suitable form; for example it may be a screw member, or it may be lock and pin system whereby pins on the first part may be arranged to selectively engage holes, set at various distances, on the second part.

The conveyor may further comprise one or more wheels which cooperate with the first belt and second belt to rotate the first and second belts around their closed loops, wherein at least the portion of the one or more wheels which cooperates with the first and second belt comprises flexible material.

The one or more wheels may cooperate with the first belt to rotate the first belt around the closed loop.

The flexible material may comprise rubber. The flexible material may comprise plastic. The provision of flexible material at the portion of wheels which cooperates with the belt(s), enables any puck on the belt, to easily pass the wheel as the belt moves through its closed loop; it will also ensure that the pucks are not displaced by the wheels when passing as the flexible material will flex to facilitate the passage of the pucks, and that the pucks engage smoothly, without slipping, between the belt and the one or more wheels.

The belt(s) may comprise flexible material. For example the belt(s) may comprise rubber. The flexible belt(s) may be configured to have a flexibility which will facilitate the pucks to pass the wheels.

The conveyor maybe configured to be asynchronous. Asynchronous in the context of the present invention means that one or more pucks which cooperate with the belt may be stopped and the belt may continue to move around its closed loop. It will also be understood that the same belt or belts may move the puck along an outgoing part of the closed loop and along the return part of the closed loop.

According to a further aspect of the present invention there is provided a puck suitable for receiving a component to be conveyed and suitable for cooperating with the first belt of a conveyor according to any one of the preceding claims, the puck comprising, a body member which comprises an n-shaped cross section wherein an under-surface of the body member defines a first surface which is configured to cooperate with a second surface of the first belt during an outgoing part of the closed loop, and wherein the body member further comprises, one or more projections, which extending parallel to the under-surface of the body member, the one or more projections being configured such that they can cooperate with the first surface of the first belt during a returning part of the closed loop, so that the puck is moved by the first belt along the closed loop, and wherein, the one or more projections are arranged on the body member such that the one or more projections and the under-surface of the body member define an area which can receive both a portion of the first belt and at least a portion of a support element which comprises a surface which can cooperate with a second surface of the first belt to support the first belt during a return part of a closed loop.

The under-surface of the body member may define a first surface which is configured to cooperate with the second surface of the first belt and a second surface of a second belt, during an outgoing part of the closed loop, and wherein the one or more projections are configured such that they can cooperate with the first surface of the first belt and a first surface of the second belt during a returning part of the closed loop, and wherein the one or more projections are arranged on the body member such that the one or more projections and the under-surface of the body member define an area which can receive, a portion of the first belt, a portion of a second belt, at least a portion of a support element which comprises a surface which can cooperate with a second surface of the first belt to support the first belt during a return part of a closed loop, and at least a portion of the support element which comprises another surface which can cooperate with a second surface of the second belt to support the second belt during a return part of a closed loop.

The under-surface of the body member and the one or more projections may cooperate with the belts, by frictionally engaging the belts.

The puck may comprise two or more projections. The puck preferably comprises four projections. The one or more projections may comprise metal.

The one or more projections may comprise a circular cross section. A circular cross section includes an oval cross section. The one or more projections may have rounded edge. The provision of one or more projections which have a circular cross section enable the puck to move easily passed the wheels on the conveyor.

The puck may comprise one or more shock absorbing members which are arranged on an outer surface of the body member. The shock-absorbing members on an outer surface of the body member will dissipate shock which is created when the puck collides with another puck. The one or more shock-absorbing members may comprise rubber projections.

The puck may further comprise a cut-out region which is configured to receive a stopper member, wherein the cut out region is provided in an under-surface of the puck, and extends in a direction along a central axis of the puck. The cut out region preferably extends to a centre of the under-surface of the puck.

The puck may further comprise one or more shock absorbing members which are arranged on the puck such that the one or more shock absorbing members can dissipate shock which is imparted on the puck by a stopper member when the stopper member engages the puck to stop the puck. The one or more shock absorbing members may be provided on a wall which defines the cut-out region. For example, the one or more shock absorbing members may comprise a rubber portion which is provided on a wall which defines the cut-out region.

According to a further aspect of the present invention there is provided a conveyor assembly comprising a conveyor according to any one of the above-mentioned conveyors and one or more pucks according to any one of the above-mentioned pucks, wherein the one or more pucks are arranged to cooperate with a belt of the conveyor.

BRIEF DESCRIPTION OF THE DRAWINGS

The invention will be better understood with the aid of the description of embodiments, which is given by way of example only, and illustrated by the figures, in which:

FIG. 1b provides an aerial view of conveyor assembly shown in FIG. 1a;

FIG. 4b provides an aerial view of an underside of the puck shown in FIG. 4a.

DETAILED DESCRIPTION OF POSSIBLE EMBODIMENTS OF THE INVENTION

Figure 1A:
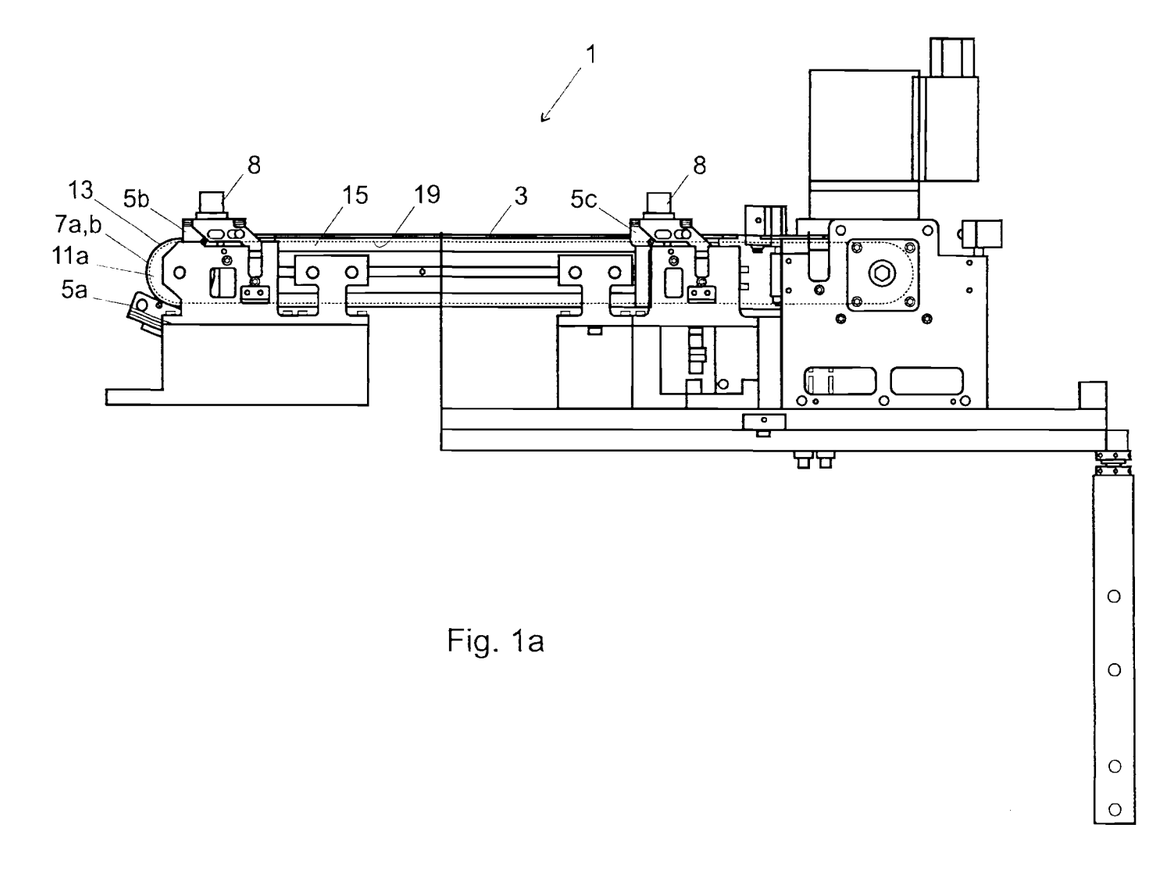
FIG. 1a provides a side view of conveyor assembly according to the present invention which comprises a conveyor according to the present invention and pucks according to the present invention.
Figure 1B:
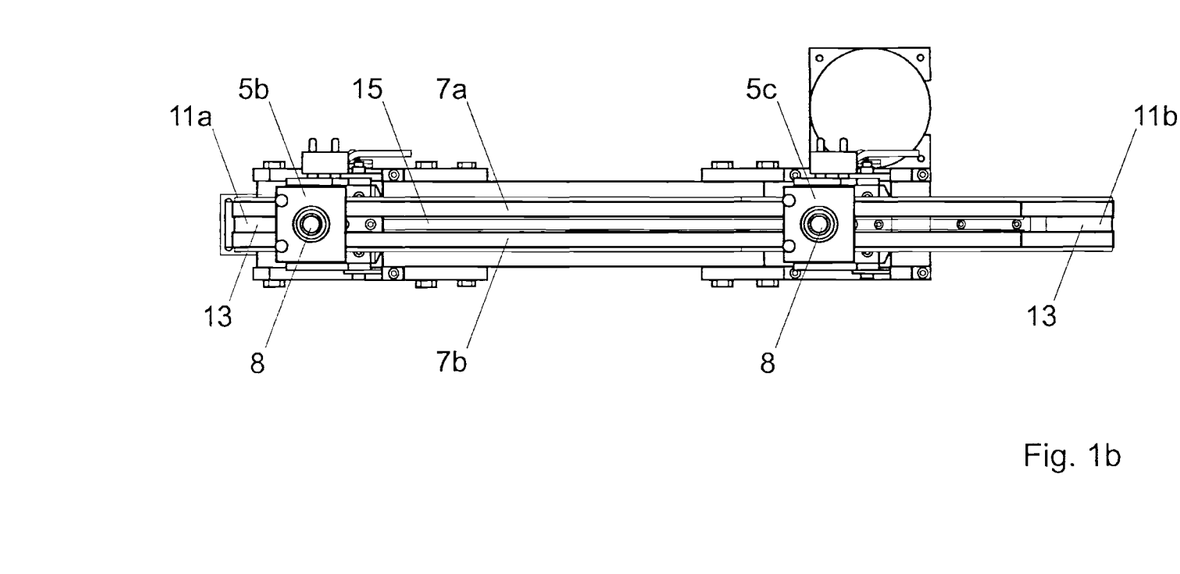

FIG. 1a provides a side view of conveyor assembly 1 according to a first aspect of the present invention and FIG. 1b provides an aerial view of the conveyor assembly shown in FIG. 1a. The conveyor assembly 1 comprises a conveyor 3 according another aspect of the present invention and three pucks 5a-c each according to a further aspect of the present invention. More pucks can be added. Components to be conveyed are loaded on pucks 5b and 5c.

The conveyor 3 comprises a first belt 7a and second belt 7b, each of which is configured to move in a closed loop 19 (indicated by dashed line). The three pucks 5a-c, are arranged to cooperate with the belts 7a,b so that the pucks 5a-c are moved by the belts 7a,b around the closed loop 19. A stopper element (not shown) may cooperate with a puck 5a-c to stop the puck from moving; typically a puck 5a-c will be stopped so that a component 8 to be conveyed can be loaded onto the puck 5a-c. The loading of the components 8 onto a puck 5a-c takes place at a loading station (not shown) in the conveyor assembly 1. A robot could be used at the loading station for loading components onto the puck, for example from a tray or vibrating bowl. An unloading station (not shown) can be placed anywhere along the belts where the pucks lay flat at the top of the link. They just have to be stopped and referenced in a given position so the components can be loaded or unloaded by the loading or unloading station, or even by hand.

The conveyor 1 further comprises two wheels 11a,b which cooperate with the first belt 7a and second belt 7b to rotate the belts 7a,b around their closed loop 19. At least a surface 13 of each wheel 11a,b which cooperates with the belts 7a,b comprises flexible material such as rubber or soft plastic for example. The provision of flexible material at the portion of the surface 13 of the wheels 11a,b which cooperates with the belts 7a,b, enables the pucks 5a-c which are cooperate with the belts 7a,b, to easily pass the wheels 11a-b as the belts 7a,b move through their closed loop 19. The flexible material will flex to allow the pucks easily pass the wheels 11a,b. Alternatively, or in addition, the belts could also have enough flexibility to allow the pucks to easily pass the wheels.

The conveyor 3 also comprises a support element 15 which supports the first and second belts 7a,b along the closed loop 19.

Figure 2:
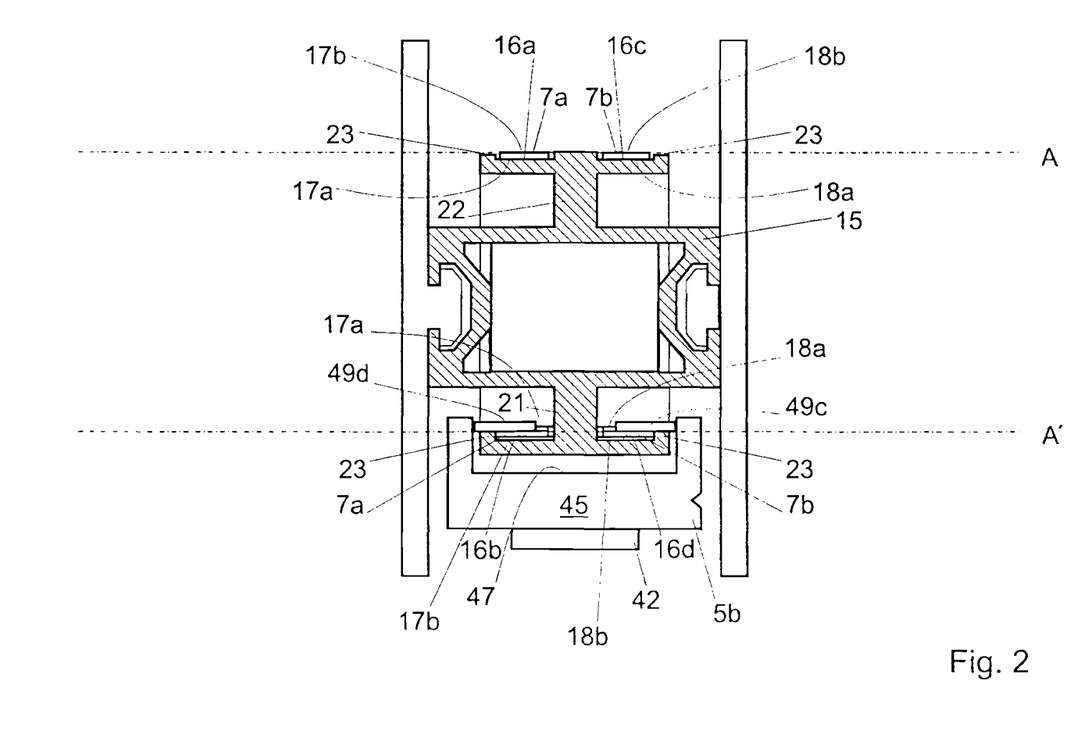
FIG. 2 provides a cross sectional view of a support element provided in the conveyor, belts, and a puck.

As shown in FIG. 2 the support element 15 comprises a first surface 16a which cooperates with a first inner surface 17a of the first belt 7a to support the first belt 7a during an outgoing part of the closed loop 19 and a second surface 16b which cooperates with a second outer surface 17b of the first belt 7a to support the first belt 7a during a returning part of the closed loop 19. The support element 15 also comprises a third surface 16c which cooperates with a first inner surface 18a of the second belt 7b to support the second belt 7b during an outgoing part of the closed loop 19 and a fourth surface 16d which cooperates with a second outer surface 18b of the second belt 7b to support the second belt 7b during a returning part of the closed loop 19. The support provided by the support element 15 will ensure that the first and second belts 7a,b do not hang at any point along the closed loop 19.

The support element 15 comprises a first member 21 which has an inverted T-shaped cross-section. The first member 21 defines the second surface 16b and fourth surface 16d. Compared to known supports provided in the art, the support element 15 is a simple structure; the support element 15 is a single component and has a simple design which is easy to manufacture.

The support element comprises a second member 22 which has a T-shaped cross-section. The second member 22 defines the first surface 16a and third surface 16c.

The first member 21 and second member 22 each have flanges 23 which are configured to restrict lateral movement of the first and second belts 7a,b.

The first and second members 21, 22 are integral, and part of a single support element which might be made of extruded metal. An O-shaped central section links the first, lower member 21 with the second, upper member 22, and provides rigidity to the support element.

The first and second belts 7a,b have the same characteristics. In particular the first and second belts 7a,b are of equal length and width. They can be produced from a single, closed belt cut in its middle in two identical closed belts. The first and second belts 7a,b are arranged such that they are laterally spaced apart, adjacent to one another and on the same planes A, A'.

Figure 3A:
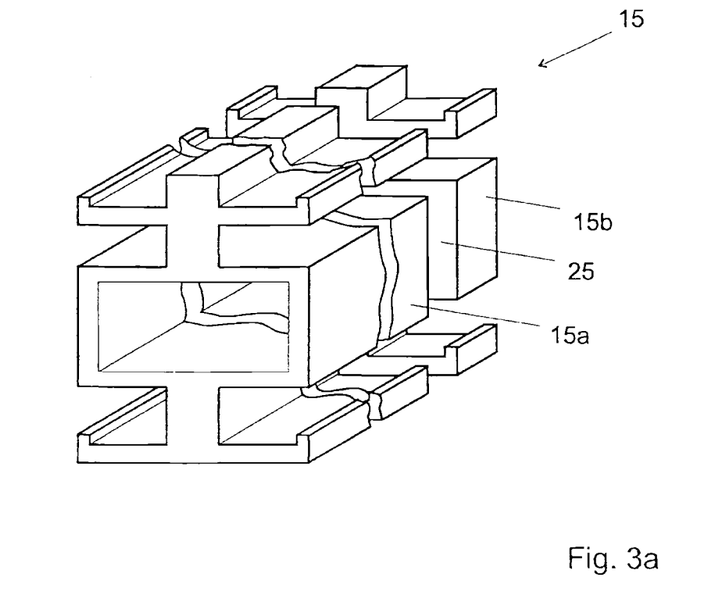
FIG. 3a provides a perspective view of the support element which is provided in the conveyor.
Figure 3B:
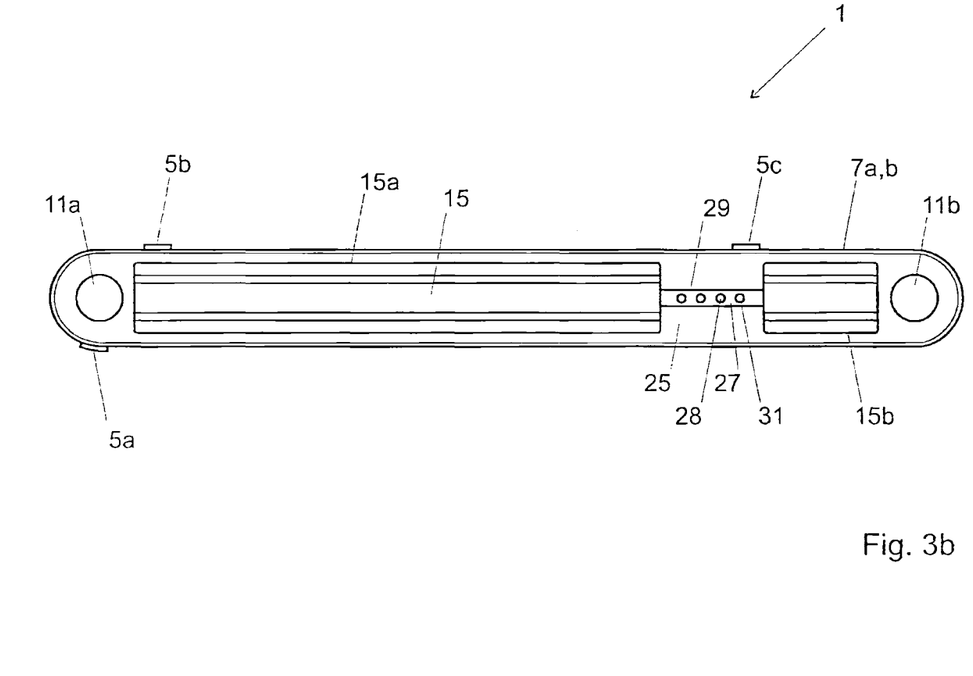
FIG. 3b provides a side view of a support element which is provided in the conveyor.

FIG. 3a provides a perspective view of the support element 15 which is provided in the conveyor assembly 1 illustrated in FIGS. 1a,b and 2; and FIG. 3b provides a side view of the support element 15.

As illustrated in FIGS. 3a and 3b the support element 15 comprises a first part 15a and second part 15b, wherein a gap 25 is interposed between the first part 15a and second part 15b. The first and second belts 7a,b can be easily squeezed together at the gap 25 allowing additional pucks 5a-c to be easily applied to the belts 7a,b and also allowing pucks 5a-c to be easily removed from the belts 7a,b.

Figure 3C:
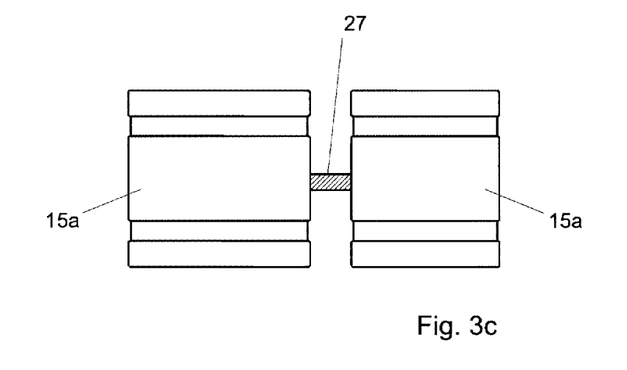
FIG. 3c provides a view of a screw member.

As shown in FIG. 3b the support element 15 further comprises a means 27 for selectively adjusting and fixing the distance between the first part 15a and second part 15b so that the effective length of the support element 15 can be adjusted. The support element 15 can thus be easily adjusted to fit belts of different lengths. For example, the support element 15 can be adjusted to fit longer belts by increasing the distance between the first part 15a and second part 15b; the effective length of the support element 15 will be increased allowing the support element 15 to fit a longer belt. Likewise, the distance between the first and second part 15a,b may be shortened to allow the support element 15 to fit a shorter belt. The means 27 for selectively adjusting and fixing the distance between the first part 15a and second part 15b may alternatively be a screw member 27, as shown in FIG. 3c.

The means 27 for selectively adjusting and fixing the distance between the first part and second part, may take any suitable form. In this particular example the means 27 for selectively adjusting and fixing the distance between the first part and second part is a telescopic lock and pin arrangement 27; a first elongate member (not shown) comprising retractable projections 28 is provided on the first part 15a of the support element 15. A second elongate member 29 comprising recesses 31 which can receive the projections 28 on the first elongate member is provided on the second part 15b of the support element 15. The first elongate member cooperates telescopically with second elongate member 29; a user can selectively slide the first elongate member within second elongate member 29 until the projections 28 are received a recess 31 on the second elongate member 29, so as to adjust the effective length of the support element 15.

Figure 4A:
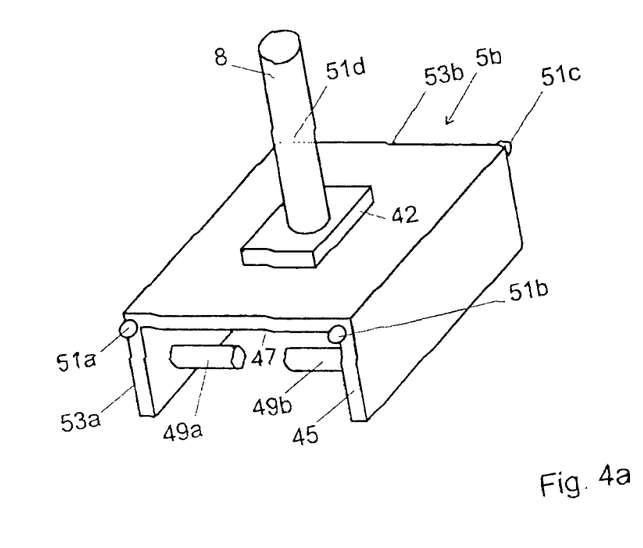
FIG. 4a provides a perspective view of a puck according to the present invention.
Figure 4B:
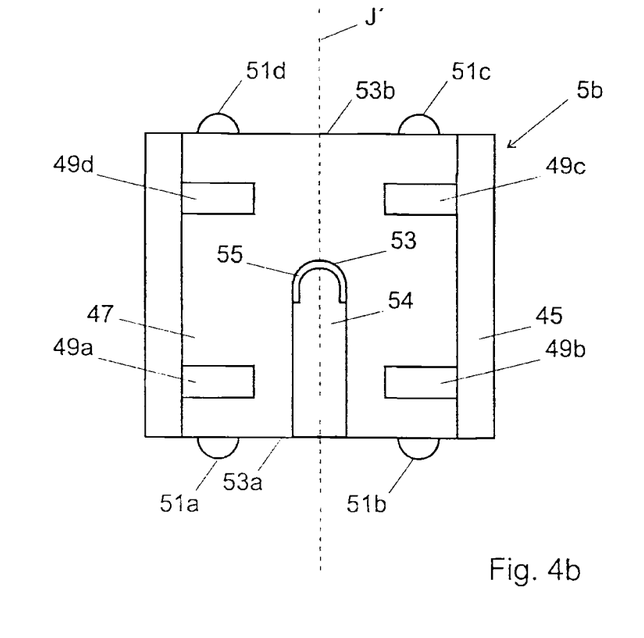

Referring now to FIGS. 4a and 4b; FIG. 4a provides a perspective view of a puck 5b according to a further aspect of the present invention and FIG. 4b provides an aerial view of an underside 41 of the puck 5b shown in FIG. 4a.

The puck 5b comprises a holder 42 suitable for holding a component 8 to be conveyed.

The puck 5b is configured such that it is suitable for cooperating with the first and second belts 7a,b of the conveyor 3; the puck 5b comprises a body member 45 which comprises an n-shaped cross section. An under-surface 47 of the body member 45 is configured to cooperate with the second outer surfaces 17b, 18b of the first and second belts 7a,b during an outgoing part of the closed loop 19, so that the puck 5b is moved by the belts 7a,b along outgoing part of the closed loop 19.

The body member 45 further comprises, four projections 49a-d which provide the surfaces which cooperate with the first inner surfaces 17a, 18a of the first and second belts 7a,b during a returning part of the closed loop 19, so that the puck 5b is moved by the belts 7a,b along the returning part of the closed loop 19. The puck 5b is thus moved by the belts 7a,b along the whole closed loop 19. The manner in which the puck 5b cooperates with the belts 7a,b along the returning part of the closed loop 19 is illustrated in FIG. 2. It will be understood that the puck 5b may comprise any number of projections 49a-d; for example the puck 5b may comprise two projections.

The four projections 49a-d each comprise a circular cross section. The provision of projections 49a-d which have a circular cross section enable the puck 5b to easily move pass the wheels 11a,b on the conveyor 3 as they are move around its closed loop 19. As previously discussed the provision of flexible material at the portion of the surface 13 of the wheels 11a,b which cooperates with the belts 7a,b, will also facilitate the puck 5b to easily pass the wheels 11a-b.

The four projections 49a-d are each composed of metal; however, it will be understood that the projections 49a-d could be made from any other suitable material with a smooth surface.

The puck 5b further comprises four rubber projections 51a-d which are arranged on outer surfaces 53a,b of the body member 45; the four rubber projections 51a-d define shock absorbing members which will dissipate shock which is created when the puck 5b collides with another puck. In another embodiment, each puck has only two rubber projections 51a-b which are arranged on one surface 53a of the body member 45.

As can be seen in FIG. 4b, the puck further comprise a cut-out region 54 provided in the under-surface 47 of the puck 5b. The cut-out region 54 is configured to receive a stopper member (e.g. stopper projection) which is selectively projected into the cut-out region 54 to selectively stop the puck 5b. Typically the puck 5b will be stopped to load a component onto the holder 42; a stopper member may be provided on the conveyor 3 and may be selectively projected so that it projects into the cut-out region and abuts a wall 53 which defines the cut-out region 54; the stopper member will stop the puck from moving as soon as it abuts the wall 53.

The cut out region 54 extends in a direction along a central axis J' of the puck 5b. Thus, when the stopper member abuts a wall 53, the puck will not be rotated by the belts 7a,b which continue to move below the under-surface 47 of the puck 5b. In this embodiment, the cut out region 54 extends to a centre of the under-surface 47 of the puck 5b.

The puck 5b further comprises a shock absorbing member 55 which is arranged on the puck 5b so that it can dissipate shock which is imparted on the puck 5b by a stopper member when the stopper member abuts the wall 53 to stop the puck 5b. The shock absorbing member 55 in this example is a rubber strip.

Various modifications and variations to the described embodiments of the invention will be apparent to those skilled in the art without departing from the scope of the invention as defined in the appended claims. Although the invention has been described in connection with specific preferred embodiments, it should be understood that the invention as claimed should not be unduly limited to such specific embodiment.

The invention claimed is:

1. A conveyor comprising:
a first belt which is configured to move in a closed loop;
a support element which comprises first surface, wherein the first surface of the support element is configured to cooperate with a first surface of the first belt such that the first belt rests on the first surface to support the first belt during an outgoing part of the closed loop and the support element further comprises a second surface, and wherein the second surface of the support element is configured to cooperate with a second surface of the first belt such that the first belt rests on the second surface to support the first belt during a return part of the closed loop, so that the first belt is prevented from hanging;
a second belt which is configured to move in a closed loop, and the support element comprises a third surface, wherein the third surface of the support element is configured to cooperate with a first surface of the second belt such that the second belt rests on the third surface to support the second belt during an outgoing part of the closed loop and the support element further comprises a fourth surface, wherein the fourth surface of the support element is configured to cooperate with a second surface of the second belt such that the second belt rests on the fourth surface to support the second belt during a return part of the closed loop, so that the second belt is prevented from hanging;
wherein the support element comprises a member which has an inverted T-shaped cross-section, which defines the second and fourth surfaces of the support element.

2. A conveyor according to claim 1, wherein the support element comprises a member which has a T-shaped cross-section, which defines the first and third surfaces.

3. A conveyor according to claim 1, wherein the first and second belts may be of equal width.

4. A conveyor according to claim 1, wherein the support element further comprises flanges which are configured to restrict lateral movement of a belt.

5. A conveyor according to claim 1, wherein the support element comprises a first part and second part, wherein a gap is interposed between the first part and second part.

6. A conveyor according to claim 5, wherein the support element further comprises a means for selectively adjusting and fixing the distance between the first part and second part so that the length of the support element can be adjusted to fit belts of various sizes.

7. A conveyor according to claim 1, wherein the conveyor further comprises one or more wheels which cooperate with the first belt and second belt to rotate the first and second belts around their closed loops, wherein at least the portion of the one or more wheels which cooperates with the first and second belt comprises flexible material.

8. A conveyor according to claim 1, wherein the conveyor further comprises one or more wheels which cooperate with the first belt and second belt to rotate the first and second belts around their closed loops, wherein said first and second belt comprises flexible material to allow pucks to easily pass the wheels.

9. A conveyor comprising:
a first belt which is configured to move in a closed loop;
a support element which comprises first surface, wherein the first surface of the support element is configured to cooperate with a first surface of the first belt to support the first belt during an outgoing part of the closed loop and the support element further comprises a second surface, and wherein the second surface of the support element is configured to cooperate with a second surface of the first belt to support the first belt during a return part of the closed loop, so that the first belt is prevented from hanging;
a second belt which is configured to move in a closed loop, and the support element comprises a third surface, wherein the third surface of the support element is configured to cooperate with a first surface of the second belt to support the second belt during an outgoing part of the closed loop and the support element further comprises a fourth surface, wherein the fourth surface of the support element is configured to cooperate with a second surface of the second belt to support the second belt during a return part of the closed loop, so that the second belt is prevented from hanging;
wherein the support element comprises a member which has an inverted T-shaped cross-section, which defines the second and fourth surfaces of the support element, wherein said second surface defined by said support element has a width which is at least equal to the width of the first belt, and wherein said fourth surface defined by said support element has a width which is at least equal to the width of the second belt.

10. A conveyor comprising:
a first belt which is configured to move in a closed loop;
a support element which comprises first surface, wherein the first surface of the support element is configured to cooperate with a first surface of the first belt to support the first belt during an outgoing part of the closed loop and the support element further comprises a second surface, and wherein the second surface of the support element is configured to cooperate with a second surface of the first belt to support the first belt during a return part of the closed loop, so that the first belt is prevented from hanging;
a second belt which is configured to move in a closed loop, and the support element comprises a third surface, wherein the third surface of the support element is configured to cooperate with a first surface of the second belt to support the second belt during an outgoing part of the closed loop and the support element further comprises a fourth surface, wherein the fourth surface of the support element is configured to cooperate with a second surface of the second belt to support the second belt during a return part of the closed loop, so that the second belt is prevented from hanging;
wherein the support element comprises a member which has an inverted T-shaped cross-section, which defines the second and fourth surfaces of the support element,
wherein the support element further comprises flanges which are configured to restrict lateral movement of a belt.

* * * * *